(12) United States Patent
Peterson

(10) Patent No.: US 6,770,192 B2
(45) Date of Patent: Aug. 3, 2004

(54) WATER SYSTEM FOR BACTERIA CONTROL

(75) Inventor: Robert R. Peterson, South Lyon, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/272,728

(22) Filed: Oct. 17, 2002

(65) Prior Publication Data

US 2003/0089651 A1 May 15, 2003

Related U.S. Application Data

(60) Provisional application No. 60/330,277, filed on Oct. 18, 2001.

(51) Int. Cl.[7] ............................... C02F 9/10; C02F 9/12
(52) U.S. Cl. ....................... 210/149; 210/192; 210/181; 210/259; 210/195.1; 422/186.3; 204/554
(58) Field of Search ................... 236/12.1–13; 210/149, 210/96.1, 175, 192, 195.1, 181, 182, 259, 900; 204/554; 422/24, 26, 27, 186.3

(56) References Cited

U.S. PATENT DOCUMENTS

| | | | | |
|---|---|---|---|---|
| 4,966,654 A | * | 10/1990 | Carberry | 202/177 |
| 5,230,807 A | * | 7/1993 | Kozlowski, II | 210/696 |
| 5,401,421 A | * | 3/1995 | Blum | 210/742 |
| 6,001,246 A | * | 12/1999 | Suenkonis | 210/180 |
| 6,270,014 B1 | * | 8/2001 | Bollas et al. | 236/12.12 |

* cited by examiner

Primary Examiner—Terry K. Cecil
(74) Attorney, Agent, or Firm—Harness, Dickey & Pierce P.L.C.

(57) ABSTRACT

A treatment system for use in a water delivery system for eradicating bacteria such as the Legionella bacteria. The treatment system includes an ultraviolet light source for killing bacteria entering the water delivery system, an electrochemical precipitation unit and a blending valve in communication with water discharged from the precipitation unit and a source of hot water.

10 Claims, 1 Drawing Sheet

WATER SYSTEM FOR BACTERIA CONTROL

This application claims the benefit of provisional application No. 60/330,277, filed on Oct. 18, 2001.

FIELD OF THE INVENTION

The present invention relates generally to water treatment systems and, more specifically, to a Legionella bacteria dispersant and eradicator system for use in a water treatment system.

BACKGROUND OF THE INVENTION

Legionella is the named genus of gram-negative, rod shaped, aerobic bacteria that is very common to aquatic warm water environments. Legionellosis is any illness caused by exposure to Legionella that occurs when a person inhales aerosols or other microscopic droplets of water containing Legionella microorganisms, and is commonly referred to as the potentially fatal Legionnaires Disease. In typical city water supply systems, the end devices for water delivery systems capable of dispersing the Legionella bacteria include faucets and showerheads.

The conditions that promote growth of this bacteria in water systems include stagnant water, a pH generally between 5 and 8, water temperatures between 68° and 122° F., and the sediment, scale, deposits and biofilms in the pipe systems. It is known that conventional hot water systems can provide most, if not all, of the above stated conditions necessary to potentially promote growth of the Legionella bacteria.

Conventional methods for controlling growth and dispersion of the Legionella bacteria include; A) the Heat-and-Flush Method; B) Chlorination; C) Ultraviolet radiation; D) Ozonation; and E) and Copper-Silver Ionization. The Heat-and-Flush Method involves superheating the water system and flushing all outlets for several minutes. The drawback to this method is that the Legionella bacteria may come back since the scale and biofilms in the plumbing where the bacteria lives are not destroyed, and/or the incoming water recontaminates the water with legionella bacteria. When the Chlorination method is used to provide temporary disinfection, chlorine is added to the water system at free levels much higher than normal for drinking water and is flushed throughout the system. For continuous disinfection, chlorine is pumped into water systems at a drinkable concentration of 1–2 mg/L of free chlorine throughout the domestic water system. However, chlorine is a very strong oxidizer and will quickly create corrosion that destroys the plumbing system. In addition, when chlorine mixes with organics, it can produce compounds thought to cause cancer, thereby requiring the system to be constantly monitored to ensure proper dosage.

As noted, another conventional method requires installation of an ultraviolet sterilizer unit on a water line to kill the legionella bacteria as the water flows through the unit. Unfortunately, the use of an ultraviolet sterilizer unit is not effective if the water system is already contaminated since the downstream bacteria cannot pass through the sterilizer unit. As an alternative, the Ozonation method involves dissolving ozone molecules into the water system to achieve a dose of about 1–2 mg/L of ozone. This dosage of ozone is effective to kill the bacteria. One drawback, however, is that ozone systems are extremely corrosive because ozone is a very strong oxidizer. Further, ozone generators are known to be temperamental and expensive.

The Copper-Silver Ionization method used for killing Legionella bacteria is operable to apply an alloy of copper and silver that is located in the stream with the water supply. The free copper and silver ions that are electrochemically released are effective in killing the bacteria. However, the electrochemical release of these ions could produce over concentrations in certain areas. Furthermore, over time, scaling deposits will form on the copper-silver alloy and will hinder ion release. In addition, this technology has certain water chemistry parameters, and silver is a registered pesticide with the EPA which requires strict monitoring constantly.

It is therefore desirable to provide an improved method or system for eliminating growth and dispersion of the Legionella bacteria in water systems. The system as detailed below and in the attached drawing entails a novel method of using certain available systems and components to eradicate conditions for Legionella and/or the bacteria itself.

SUMMARY OF THE INVENTION

Accordingly, it is the object of the present invention to provide a Legionella bacteria dispersant and eradicator system for use in a water treatment system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
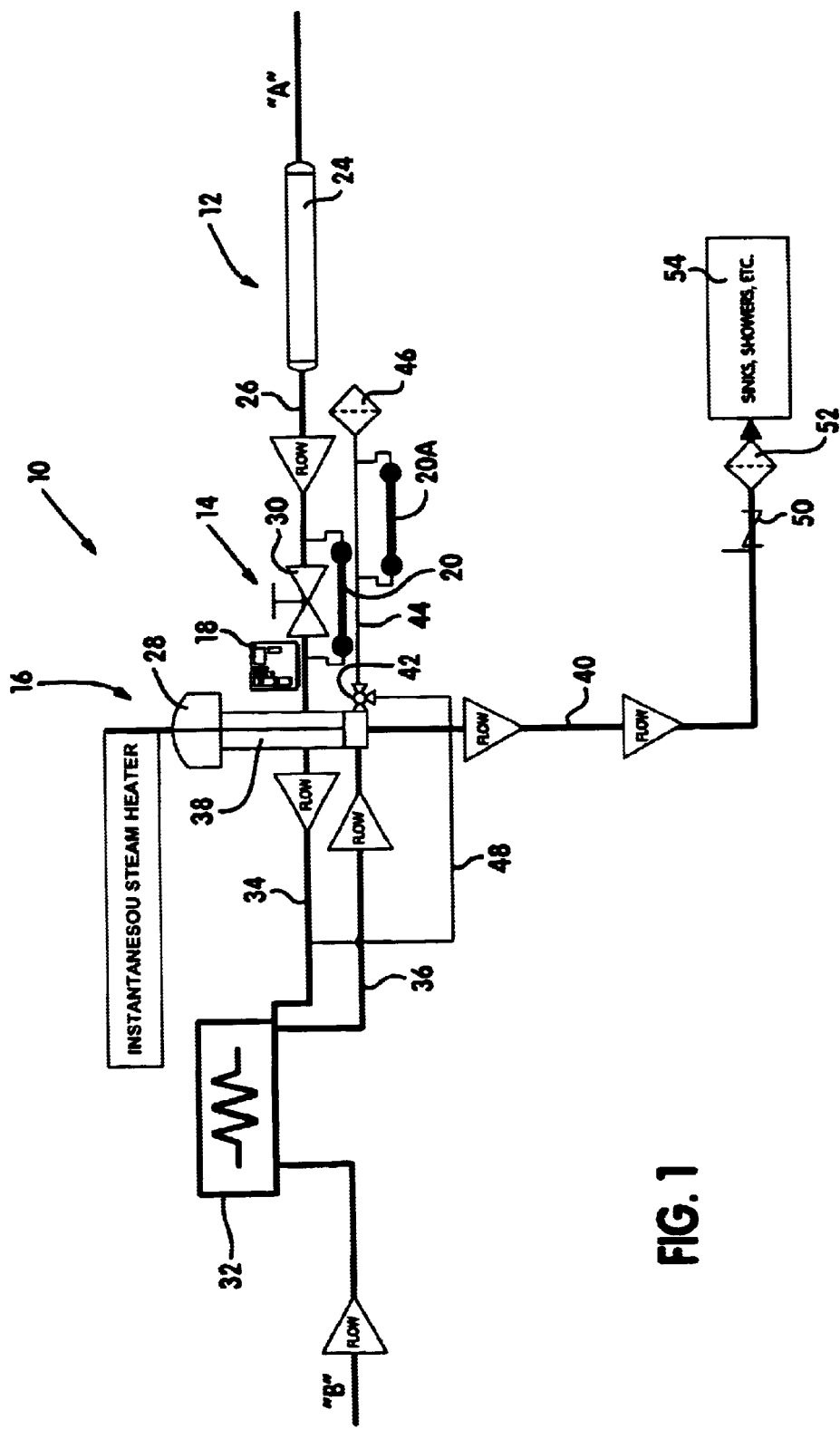
FIG. 1 is a diagram of a water treatment system equipped with a pair of electronic mineral precipitator units, preferably of the kind that directly releases hydroxyl ions into the water using direct electrochemical contact, an ultraviolet light unit, and an instantaneous steam heater or other water transfer device such as, water side heaters, boilers, chillers and cooling towers.

The following description of the preferred embodiment is merely exemplary in nature and is in no way intended to limit the invention, its application, or uses.

The present invention relates to a water treatment system 10 which incorporates an ultraviolet water process 12, an electrochemical mineral precipitation process 14, and a heating or cooling process 16 including, without limitation, heaters, boilers, chillers or cooling towers.

The electronic mineral precipitation process 14 is comprised of a direct electrochemical treatment applied to the in-coming water supply, denoted by Arrow "A", that can be accomplished by applying a direct pulse of electricity generated a power generator 18 to water flowing through a precipitator cell 20. Precipitation cell 20 functions to precipitate minerals through a chemical reaction with the water resulting in the release of hydroxyl ions creating carbonates. The resulting carbonates aid in breaking loose existing scale, deposits and biofilms, which typically is where the Legionella bacteria normally exist. These precipitated minerals themselves also act as a traveling medium for the bacteria to be delivered to the heating process 16 for biological killing. One example of an apparatus suitable for use as precipitator cell 20 is disclosed in U.S. Pat. No. 5,230,807.

Electrochemical mineral precipitation process but can include more than one precipitation cell depending on size and application. An ultraviolet light (UV) unit is incorporated for bacteria killing as the material recirculates in cold water applications, and can also be used on the cold water inlet for heater applications. A strainer and filter are used on all applications to remove the scale, dirt, and biofilms that are loosened and circulated with this process. The strainer captures the large materials while the filter captures fine mineral precipitates. For treating water discharged from an instantaneous steam heater, the system normally includes a blending valve and an AMOT valve. The blending valve mixes the cold ultraviolet treated water to the water heated by the instantaneous steam heater in order to temper down the water to a desired outlet temperature. The AMOT valve has a temperature sensing function, usually provided by a wax element that moves at certain temperatures, thereby allowing water to be diverted with a 3-way valve and reheated when cooled by the natural radiation of a hot water recirculation loop. A separate exchanger can be used to duplicate natural radiation. If an AMOT valve is set many degrees below the blended water temperature and the natural radiation, recirculation of the heated water is not continuous through the heater process 16. The present invention calls for the AMOT valve to be set at the blended water temperature, thus allowing constant recirculation of the water through the heater and the blending valve, when the heater is not in demand. The continuous recirculation of the water creates a non stagnant water condition and constant bacteria kill through the high temperature heather. This continuous recirculation also provides the delivering method for the scale, deposits, biofilms and bacteria to be filtered from the recirculation system. This can also be delivered by a blow down or automatic bleed on a continuous basis.

Specifically referring to the water treatment system 10 shown in FIG. 1, cold water is supplied to the inlet of an ultraviolet light (UV) sterilizer unit 24. The radiation generated by Unit 24 is operable to kill the Legionella bacteria in the water such that the cold "UV" treated water flowing in line 26 is delivered to an inlet of an instantaneous steam heater 28. A shut-off valve 30 is located in line 26 and the water is shown to be capable of by-passing valve 30 to flow through a first precipitator cell 20. As noted, cell 20 receives a pulsed electric signal from power generator 18 for precipitating minerals in the water, thereby changing the carbonate and bicarbonate water chemistry to allow existing scale, deposits and biofilms to break free. These precipitated minerals then act as a scouring traveling medium carrying the bacteria and which is delivered to steam heater 28 for biological killing and, ultimately to be filtered out of the system.

A portion of the cold water delivered to heater 28 is supplied to a heat exchanger 32 via line 34. Heat exchanger 32 is operable to transform an inlet stream of steam, denoted by Arrow "B", into super-heated water in a line 36 which is delivered to a blending valve 38. Hot water in line 36 is typically maintained at about 200° F. Blending valve 38 mixes the cold water with the hot water to provide a desired outlet water temperature in outlet line 40. An AMOT valve 42 permits a portion of the outlet water to be delivered to two different flow paths. The first flow path is a recirculation line 44 communicating with the water system's recirculation loop and including an in-line strainer/filter unit 46. As seen, a second precipitator cell 20A is shown in recirculation line 44 to provide further precipitate removal from the system. The second flow path is a line 48 permitting blended water to be delivered back to heat exchanger 32 via line 34.

The blended temperature of the water in outlet 40 flows through a check valve 50 and a bacteriostatic filter 52 for delivery to an output delivery device 54 such as, for example, a sink, showerhead, etc. Since line 40 is a dead-leg, that is, a line capable of stagnant (i.e., non-flow) conditions when delivery device 54 is closed, line 40 may optionally be connected to the recirculation loop at check valve 50.

It is important to know that this novel method is described with an instantaneous heater but is not just limited to thereto. The only difference would be that the UV unit would not be sourced on the blended water line that is mentioned only as a cost savings to this method and is not shown that way on the drawing. It can be used on other gas, oil, and electrical sourced water heaters.

It is also important to point out that AMOT recirculation control is not the only recirculation method for having continuous hot water recirculation. In some instances when natural radiation does not occur, a radiator can be incorporated into the recirculation loop. Other instantaneous steam heaters that do not provide adequate flow to the heater because of a forward flow valve before the heat exchanger will require a chilling process to cool water for reflow back through the instantaneous heater. This chilling process can a refrigerant air chiller or water chiller. It can also be a heat exchanger with the cooling tower water, or cold-water supply as a recirculation loop. Blow down or bleed can also be incorporated. Some heaters will only need one mineral precipitator if the design of the loop permits constant flow through the precipitator.

As noted, stagnant water can promote Legionella growth so the customer can have the option of having a small tee or saddle tap incorporated at the end of a dead leg pipe which is usually a faucet or shower and have that line feed back into the recirculation loop after the pump. This allows the entire system to be recirculated with hot water that is rerun through the heater to kill any Legionella bacteria. Small pumps can also be incorporated on each tee line if the main recirculating pump is located too far from the dead leg. A method much easier to install is to have a small bleed at the end of the dead leg and have that water run into a drain. Since there is no cost in heating the water because the steam is already available as the heating source for instantaneous heaters, the only cost is the small amount of water being bled from the system. These methods of course can be cost prohibitive due to pressures of the water system and cost of the water itself and should not be considered necessary with this system to be able to totally recirculate water in dead leg situations. This method will keep the majority of the closed loop system clean and dead legs should still be monitored for Legionella bacteria.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A water treatment system, comprising:
   a source of water to be treated;
   an ultraviolet sterilizer unit operable for applying ultraviolet radiation to said water;
   a first electrochemical precipitator selectively operable to precipitate minerals in the ultraviolet radiation treated water;

a heating device for heating a first portion of said ultraviolet radiation treated water received from said precipitator to a superheated temperature for killing bacteria;

a blending device for tempering the heated first portion of treated water with a second portion of said ultraviolet radiation treated water to obtain a blended treated water having a desired temperature; and a recirculating loop including a temperature-responsive valve set to the same temperature as the temperature of said blended water for providing constant recirculation of at least a portion of said blended treated water to said heating device.

2. The system of claim 1 wherein said heating device includes an instantaneous steam heater.

3. The system of claim 1 wherein said heating device includes a heat exchanger.

4. The system of claim 1 wherein said superheated temperature is approximately 200° F.

5. The system of claim 1 wherein said blending device includes a blending valve.

6. The system of claim 1 wherein said valve is a three-way valve.

7. The system of claim 6 further comprising a shut-off valve located between said ultraviolet sterilizer unit and said heating device operable to selectively direct said fluid flow through said electrochemical precipitator.

8. The system of claim 1 wherein said recirculation loop includes a second electrochemical precipitator and a strainer.

9. The system of claim 8 further comprising a generator to provide electrical pulses to said first and second electrochemical precipitators.

10. The system of claim 1 further comprising an output delivery system located downstream from said valve including a bacteria filter and a check valve, wherein said check valve is adapted to enable connection of said output delivery system to said recirculation loop.

* * * * *

UNITED STATES PATENT AND TRADEMARK OFFICE
CERTIFICATE OF CORRECTION

PATENT NO. : 6,770,192 B2
APPLICATION NO. : 10/272728
DATED : August 3, 2004
INVENTOR(S) : Robert R. Peterson It is certified that error appears in the above-identified patent and that said Letters Patent is hereby corrected as shown below:

| | |
|---|---|
| Column 1, Line 36 | after E), delete "and" |
| Column 2, Line 60 | after "generated", insert --by-- |
| Column 3, Line 5 | after "process", delete --but-- |
| Column 3, Line 34 | "heather" should be --heater-- |
| Column 4, Line 13 | after "limited", delete "to" |
| Column 4, Line 28 | after "can", delete "be" |
| Column 6, Line 8, Claim 7 | after "through said", insert --first-- |

Signed and Sealed this

Second Day of June, 2009

JOHN DOLL
*Acting Director of the United States Patent and Trademark Office*